United States Patent Office 3,452,479
Patented July 1, 1969

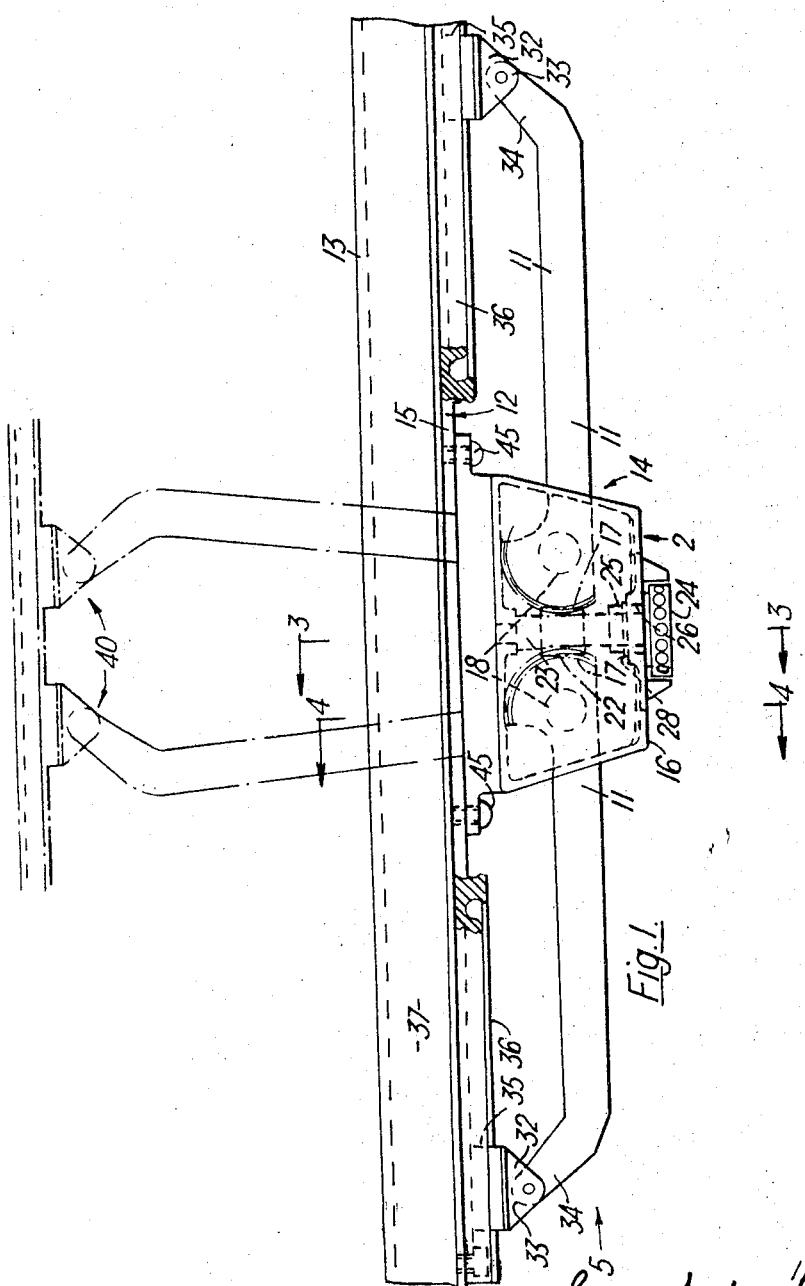

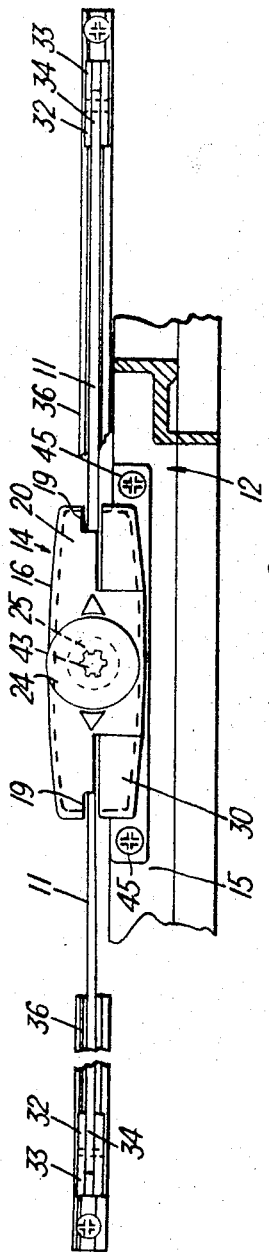

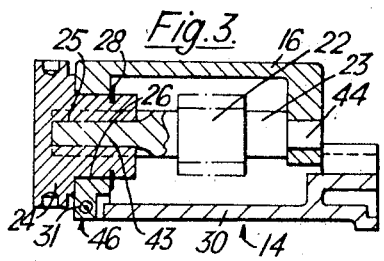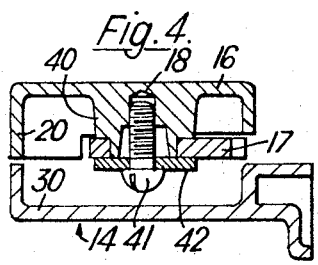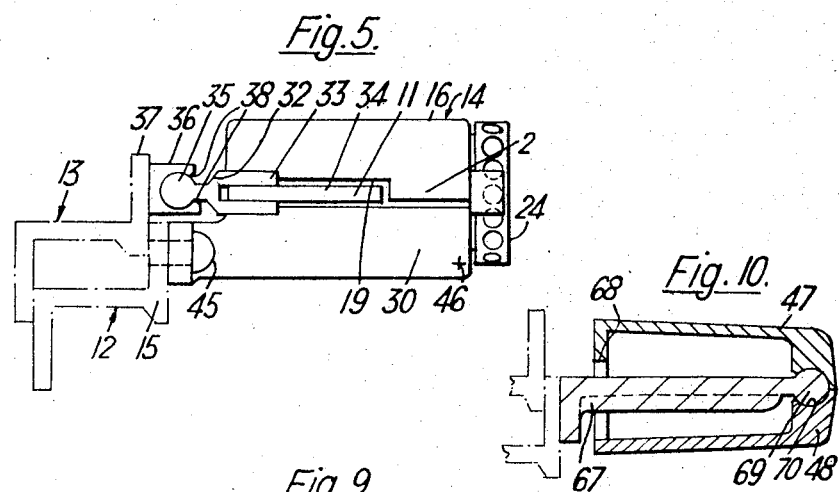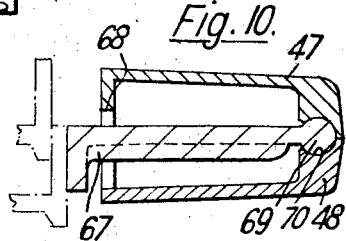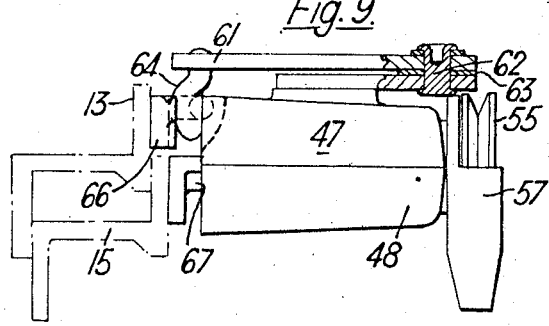

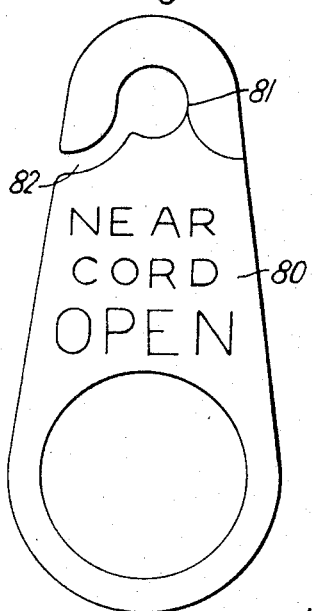
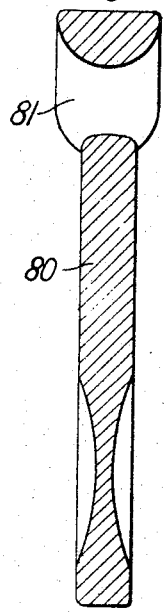
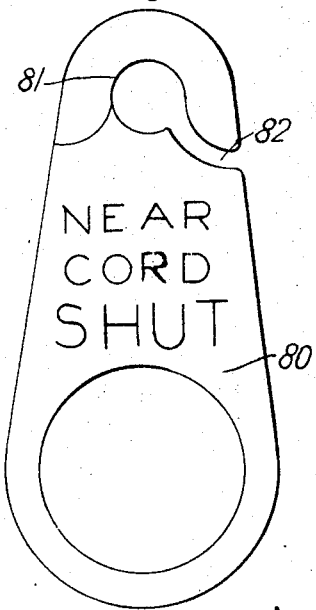

---

3,452,479
WINDOW-OPERATING GEAR
James Sydney Bentley, Basildon, Essex, England, assignor to Teleflex Products Limited, Basildon, Essex, England, a British company
Filed July 16, 1965, Ser. No. 472,506
Claims priority, application Great Britain, July 17, 1964, 29,293/64
Int. Cl. E05f *11/00;* G09f *3/00*
U.S. Cl. 49—324
6 Claims

ABSTRACT OF THE DISCLOSURE

A window opening and closing device comprising at least one control arm having an active end adapted to be coupled to a window sash and being caused to swing by operation of a gear mechanism constituting an actuator therefore, the actuator and control arm pivot being borne by a carrier that is adapted to be hingedly mounted on a fixed part of a window frame so that as the sash opens and closes the change in inclination of the control arm is in the direction normal to the plane in which the arm swings and is accommodated at least in part by hinging movement of the carrier on the frame.

---

*Disclosure of invention*

This invention relates to window-openers, more particularly of the manually-operated type.

The commonest device used in the manual opening and closing of casement windows is the peg stay. It is simple and cheap but considered in the light of modern design trends it has a number of disadvantages. It has a somewhat unsightly appearance especially when fitted in a position where it is seen silhouetted against the window glass; it projects inward when the sash is only partly open and so can interfere with, or be knocked off by, the operation of a window blind; and it is difficult to reach behind, for example, a venetian blind. Moreover, it is particularly unsatisfactory for use where a window frame is fitted with a top vent in the form of a shallow overhung sash that is long in the horizontal direction. Such long vents need two supports but it is not a practical matter to operate two peg stays together; and when a vent is wide open the peg stay adopts an angle which can make it quite insecure.

It is therefore an object of the invention to provide a reasonably cheap alternative to the peg stay which does not suffer from the same disadvantages and which can be adapted for use on long top vents.

According to the present invention, a window opening and closing device comprises at least one control arm having an active end adapted to be coupled to a window sash and being caused to swing by operation of a gear mechanism constituting an actuator therefore, and the actuator and control arm pivot are borne by a carrier that is adapted to be hingedly mounted on a fixed part of a window frame so that as the sash opens and closes the change in inclination of the control arm in the direction normal to the plane in which the arm swings is accommodated at least in part by hinging movement of the carrier on the frame.

This measure contributes materially to achieving a comparatively simple and inexpensive yet reliable window operator.

In one form, there may be two control arms arranged symmetrically to swing in opposite directions, the active ends of the arms being formed with pivots that run in guide means extending longitudinally of the sash frame. In another form, the control arm may be one of a pair of folding links coupled between the actuator and the window sash.

Figure 6:
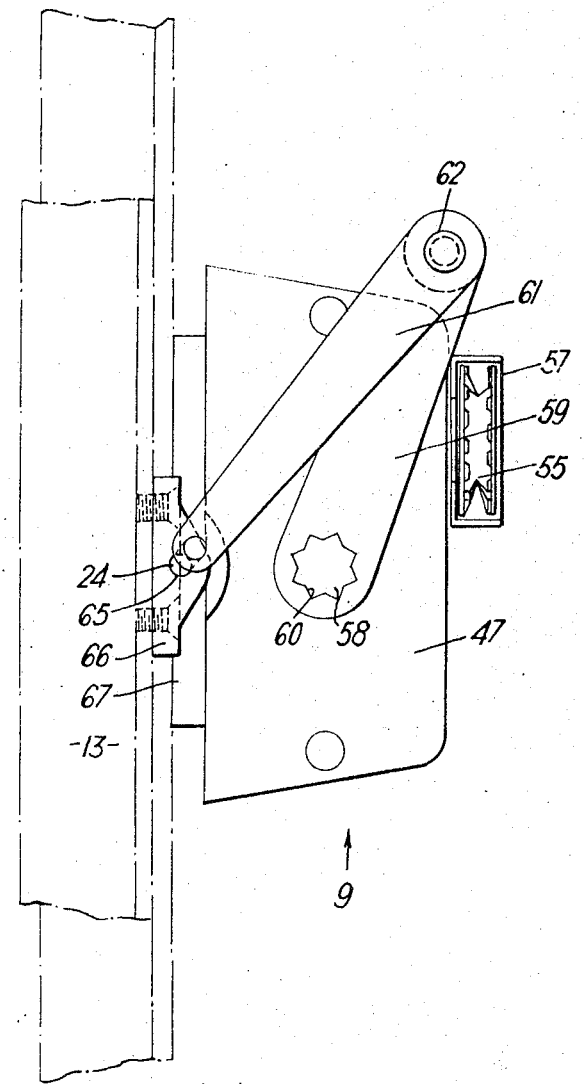
Figure 7:
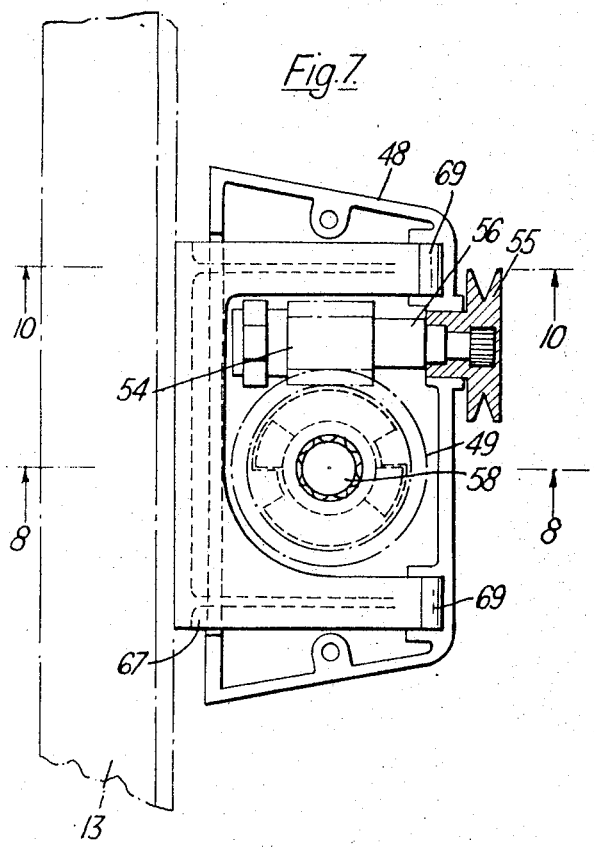
Figure 8:
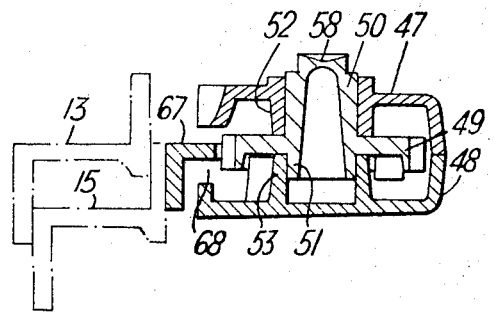

The above and other features will be apparent in the following description of two examples of window operators according to the invention, reference being had to the accompanying drawings, in which:

FIGURE 1 is a plan of a double-armed window operator,
FIGURE 2 is an elevation in the direction of the arrow 2 of FIGURE 1,
FIGURE 3 is a section on the line 3—3 of FIGURE 1,
FIGURE 4 is a section on the line 4—4 of FIGURE 1,
FIGURE 5 is an elevation in the direction of the arrow 5 of FIGURE 1,
FIGURE 6 is a plan of a second form of window operator in which the effect is transmitted to the window sash by folding links,
FIGURE 7 is a similar view to FIGURE 6 but partly in section and with the links and top cover removed.
FIGURE 8 is a section on the line 8—8 of FIGURE 7,
FIGURE 9 is an elevation in the direction of the arrow 9 of FIGURE 6,
FIGURE 10 is a section of line 10—10 of FIGURE 7, and
FIGURES 11, 12 and 13 are respectively an elevation of one face, a side elevation in section, and an elevation of the opposite face, of a tag to be fitted to the operating cords of the devices of FIGURES 1 to 10.

The device illustrated in FIGURES 1 to 5 is a quadrant type window operator having two symmetrically-disposed control arms 11 that swing in opposite directions each through substantially 90°. The window operator is shown fitted to a long top vent comprising a fixed frame 12 and an overhung sash 13.

The arms 11 are supported on and caused to swing by an actuator 14 mounted midway along the transom 15 of the fixed window frame. The actuator has a body 16 which overlies and acts as a top cover for the moving parts. Carried under the body 16 are two toothed sectors 17 able to turn about pivot axes 18 spaced in the direction of length of the transom, and these sectors are, in fact, at the ends of and integral with the control arms 11, each arm and sector being formed as a metal stamping. The control arms emerge from under the actuator body 16 by way of openings 19 in a depending skirt 20 thereof.

Each sector 17 is journalled on a respective hub 40 integral with the actuator body 16, being retained thereon by a screw 41 and washer 42.

Between the sectors 17 and in mesh with each is a worm 22. The worm is integral with its spindle 23, being made of a synthetic plastic material, for example Delrin. The worm spindle extends substantially horizontally, its axis being roughly normal to the general plane of the fixed window frame, and outside the body or cover 16 there is a drive wheel or pulley 24 fast with the worm spindle. The pulley 24 has an internally splined hub or bush 25 which passes through a bearing aperture 26 formed in the body 16 and is engaged around a correspondingly splined end portion 43 of the worm spindle 23. At the other end of the worm spindle a reduced portion 44 is journalled in a further bearing aperture in the opposite side of the body 16. The hub 25 has an annular channel therein to receive a retaining ring 28 that holds the hub captive in the body 16. This also holds the spindle 23 and worm 22 in place.

The actuator body 16 is not itself directly secured to the transom 15 but it is hinged on a stationary matching fixing bracket 30 which lies underneath it. The bracket 30 is bolted or screwed to the transom, as at 45, and the hinge connection 46 between this bracket and the body 16 is disposed at the side thereof away from window frame, the hinge pin 31 being horizontally and parallel to the general plane of the frame.

The ends of the control arms 11 remote from the actuator 14 are bent toward the sash 13 and coupled to it by means of connector pieces 32. Each connector piece has a forked portion 33 pinned to the end 34 of the corresponding control arm, and integral with the fork is a slide portion 35 of generally rod-like form that is able to turn in and slide along a guide track 36 secured horizontally to the bottom rail 37 of the sash. The guide track 36 is of substantially circular internal cross-section to match the cross section of the rod portion 35 of the connector 32, and a slot 38 allows the neck of the connector piece 32, attaching the fork portion 33 to the rod portion 35, to pass through. The slot 38 is wide enough to allow a degree of relative pivotal movement between the connector and the guide track about the axis of the rod portion 35 of the connector. The connector pieces 32, which thus form a type of universal joint between each arm 11 and the sash 13, can be moulded in synthetic plastic material, for example nylon.

When the sash is closed the two control arms 11 lie substantially parallel to the transom and the bottom rail of the sash, extending in opposite directions from the actuator in substantial alignment with one another as can best be seen in FIGURES 1 and 2. It will be noted that at this time the two control arms engage the sash at or near the outer ends of the guide tracks 36 and therefore the sash is held securely closed by restraint applied at two positions well spaced on either side of its middle. To open the sash, the wheel 24 is rotated by appropriate means so that the worm 22 turns the two sectors 17 in opposite directions and thereby swings the control arms out and toward one another. This applies equal effort on the sash at two points spaced along its length; these two points come closer together as the sash opens, in that the connector slide portions 35 slide toward one another along the tracks 36, but they remain symmetrically disposed about the middle of the sash length. In the fully open position the control arms are almost parallel, with the connectors 32 at their active ends quite close together, as can be seen from the broken line indication at 40 in FIGURE 1.

As the sash is opened the active ends of the control arms rise somewhat with the sash rail 37 and this is accommodated by slight upward hinging of the actuator 14 and the control arms about the hinge connection 46 to the fixing bracket 30. In this way the mechanical drive through the actuator and the arms to the sash is kept uncomplicated. The change of angle, in the vertical plane, between the control arms and the sash that takes place on opening is allowed for by pivotal movement of the slide portions 35 of the connector pieces 32 in the guide tracks 36.

The whole arrangement provides a window operator that is neat in appearance and does not present an objectionable silhouette since it lies for the most part immediately alongside the transom of the window frame. It is very well adapted to the operation of a long top vent, although it can, of course, be employed for other kinds of sash as well. There are no projecting parts to interfere with blinds or curtains and it can be operated by cords or cables from any convenient remote situation.

FIGURES 6 to 10 illustrate an alternative arrangement employing only a single control arm. The actuator body in this case is a plastic box made from upper and lower half boxes 47, 48. As seen in FIGURE 8 a worm wheel 49 has hub portions 50 and 51 journalled respectively in upper and lower bearings 52, 53 formed integrally in the upper and lower half boxes, vertical displacement of the worm wheel being prevented by abutment of the bearing ends against opposite sides thereof. A worm 54, which may be a nylon moulding, meshes with the worm wheel 49 and can be turned by an external cord pulley 55, the worm being carried on a steel shaft 56 which projects out of the actuator box and has the pulley fast on its external end. The worm may be moulded on to its shaft. The operating cord (not shown) is a spliced endless plaited nylon cord the two runs of which are led on to the pulley 55 through a tapered pulley shroud 57 which may be a plastic moulding that clips on to a shoulder on the exterior of the actuator box; or alternatively the cord runs may be guided on to the pulley from left or right by an apertured guide (not shown) on the actuator box on the left or right of the pulley.

The upper hub portion 50 of the worm wheel 49 projects out through the upper half box 47 and its external end 58 is reduced and splined to receive one end of the control arm 59 which has an aperture 60 with corresponding internal splines. The arm 59 constitutes one of a pair of folding links 59, 61 an end of the second link 61 being pivotally connected to the swinging end of the first by means of a rivet 62 with a fibre washer 63 interposed between the two links. The other end of the second link 61 is connected to the sash 13 by means of a hook 64 that is engaged in a hole 65 in a small bracket 66 attached to the bottom rail of the sash. The geometry of the links 59, 61 is such as to give maximum mechanical advantage when the window is closed, and also when the window is fully open; these are important requirements for window operating gear.

The fixed bracket 67 on the transom 15 in this case extends horizontally into the interior of the actuator box, as best seen in FIGURE 10, through an opening 68 in the inner wall thereof. This bracket is of substantially U-shape in plan, as seen in FIGURE 7, and the ends of its U-limbs 69 are of part-cylindrical form (FIGURE 10) fitting into correspondingly shaped recesses 70 in the internal face of the outer wall of the actuator box, thereby to form a hinge connection between the box and the bracket 67. Forming the bracket 67 in a U configuration as shown enables it to straddle the working parts within the actuator box, that is to say the worm wheel 49, worm 54 and the worm shaft 56.

As in the case of the first embodiment, the actuator box hinges upon the fixed bracket 67 to a limited extent, when the window is opened and closed, so as to allow for the fact that the bottom rail of the sash, to which the folding links 59, 61 are connected, rises and falls. The opening 68 through which the bracket 67 passes is deep enough to permit this. The actuator and folding arms give tight closing and are self-sustaining at any angle of window opening.

The devices as described can be produced very cheaply, the parts and the assembly being essentially simple. Moreover, by the use of synthetic plastic materials for a number of the working components the devices are made quiet in operation and the need for lubrication is eliminated. Thus there is no oil to collect dirt or spoil curtains and drapes. Each device is easily fixed to a window and presents a compact profile.

FIGURES 11 to 13 show an improved fob or cord-tag for use with the aforedescribed window-operating gear. This consists of a tablet 80 having a hole 81 at the top through which the endless operating cord is free running, the tablet being heavy enough to maintain the cord runs in tension when hanging freely. The tablet may be of metal or a plastic moulding. The cord can be threaded through the hole before splicing, or in the form as illustrated it can be forced through a channel 82 leading to the hole 81 the natural dimension of which is too small to pass the cord but which can be temporarily sprung wide enough for the purpose. Or again, the tablet could be of a deformable material that can be clinched closed after the cord has been put through an opening initially provided.

When the tablet 80 is held in the hand with a flat face toward the user it will be seen that one cord run will be nearer to the user than the other, and when the tablet is turned round to present the other face the cord positions are reversed. This is turned to advantage by lettering the faces of the tablet so that they indicate the function that the near cord run will perform in each case, i.e. whether pulling it will open or close the window.

The operating cord loop and fob 80 may hang vertically directly from the window operator, or from a sheave and fairlead at the side of the window frame.

I claim:

1. A window and vent opening and closing device comprising at least one swinging control arm having a pivoted end about which it swings and an active end, coupling means on said active end adapted to couple said active end to a window sash, a carrier provided with hinge mounting means whereby it is adapted to be hingedly mounted on a fixed part of a window frame for hinging thereon about an axis substantially parallel to the general plane of swinging of the control arm, pivot means disposed on said carrier with its pivot axist at right angles to said hinge axis, said pivot means receiving said pivoted end of said control arm, and an actuator disposed on said carrier and including gear mechanism operable to swing said control arm about said pivot means, the change in inclination of the control arm in the direction normal to the plane in which the control arm swings being accommodated at least in part by hinging movement on the window frame of the carrier, pivot means and actuator.

2. A device according to claim 1, wherein said coupling means comprises a second arm having one end pivotally connected to said active end of said swinging control arm and having its other end adapted to be pivotally connected to the window sash, whereby said two arms constitute an articulated pair of folding links.

3. A device according to claim 1, wherein said gear mechanism comprises a worm wheel secured to said pivoted end of said swinging control arm, and a worm in mesh with said worm wheel, said actuator further comprises a drive pulley that rotates as one with said worm, and wherein said carrier comprises a box housing containing the worm and worm wheel and providing bearings therefor, said drive pulley being at the exterior of said box.

4. A device according to claim 3, wherein the box housing lies alongside the transom of the window frame and has an opening in its wall closest thereto, and said hinge mounting means comprises a bracket fixed on the transom which bracket extends into the box through said opening and makes pivotal connection with the box at the side wall thereof farthest from the transom.

5. A device according to claim 4, wherein the fixed bracket is substantially of U-shape so as to straddle the working parts of the actuator within the box.

6. A device according to claim 2, wherein said second arm has a universal joint at its end adapted to be connected to the window sash.

References Cited

UNITED STATES PATENTS

| | | | |
|---|---|---|---|
| 1,016,260 | 2/1912 | Fuchs | 40—2 X |
| 1,040,570 | 10/1912 | Osborne | 74—89.14 |
| 2,528,572 | 10/1950 | Bancroft | 49—324 |
| 2,532,202 | 11/1950 | Steinbachner | 160—173 |
| 2,773,687 | 12/1956 | Koehler | 49—357 |
| 2,811,349 | 10/1957 | Bondurant et al. | 49—324 |
| 3,098,647 | 7/1963 | Teggelaar et al. | 74—89.14 |
| 159,944 | 2/1875 | Mathers | 160—321 X |
| 209,313 | 10/1878 | White | 160—320 |

DAVID J. WILLIAMOWSKY, *Primary Examiner.*

J. K. BELL, *Assistant Examiner.*

U.S. Cl. X.R.

40—316, 331; 49—357